Patented Feb. 14, 1950

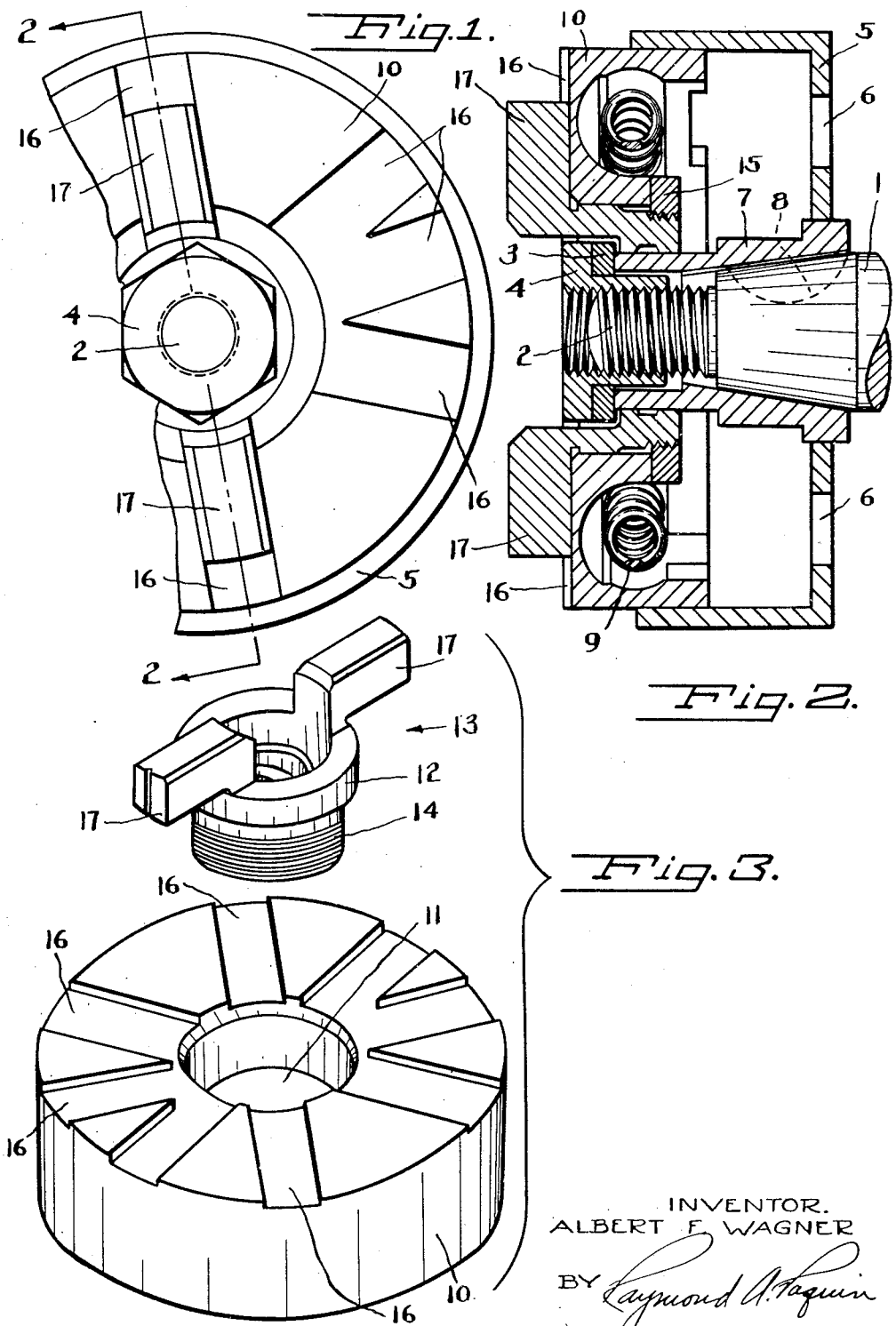

2,497,642

UNITED STATES PATENT OFFICE 2,497,642

IMPULSE COUPLING

Albert F. Wagner, Longmeadow, Mass., assignor to American Bosch Corporation, Springfield, Mass., a corporation of New York Application March 15, 1947, Serial No. 734,929

5 Claims. (Cl. 287—103)

1

This invention relates to new and useful improvements in impulse couplings for use in connection with magnetos or electric generators adapted to supply ignition current to internal combustion engines and has particular reference to the provision of such a device having means whereby the driving lugs or tongues thereof may be easily and quickly positioned to meet the requirements of the particular installation and which device is simple and economical in construction and efficient in operation.

In the application of a magneto with an impulse coupling connected therewith for facilitating starting of the engine, the driving lugs or tongues of the impulse coupling are adapted to engage a slot in the timing gear or drive member of the engine for operative connection therewith. As the timing gears are of necessity in fixed relation with the engine to properly time the engine and the impulse coupling is in fixed relation with the magneto to which it is attached, considerable difficulty has been encountered in connecting the driving lugs or tongues of the impulse coupling with the slot provided for connection therewith in the engine timing gear. Where the magneto was of the base mounted type, it has been possible with considerable difficulty to align the driving lugs or tongues with the timing gear slot, but this has not been possible with flange mounted magnetos and has necessitated the providing of driving members or coupling flanges with the lugs or tongues in numerous positions to insure having the proper one for each installation which has been found complicated by the fact that some of the installations were for clockwise rotation and others for anti-clockwise rotation, thus further increasing the number of parts required to be able to accommodate all desired installations.

It is, therefore, the principal object of the present invention to provide an impulse coupling which is adapted for either flange mounted or base mounted magnetos and which will overcome the prior difficulties set forth above and which is capable of adjustment to meet practically all desired installations and which is relatively simple and economical in construction and efficient in operation.

Another object of the invention is to provide an impulse coupling of the type set forth which is formed of a minimum number of parts and which may be easily and quickly adjusted for the particular installation.

Other objects and advantages of the invention will be apparent from the following description taken in connection with the accompanying drawings. It will be understood that changes may be made in the details of construction and arrangement of parts shown and described, as the preferred form has been given by way of illustration only.

Referring to the drawings:

Fig. 1 is a fragmentary front view of an impulse coupling embodying the invention;

Fig. 2 is an axial section thereof taken on line 2—2 of Fig. 1 looking in the direction of the arrows; and Fig. 3 is an exploded, perspective view thereof.

Referring more particularly to the drawings, wherein similar reference characters designate corresponding parts throughout the several views, 1 is the magneto shaft on which the impulse coupling is to be mounted and which has the threaded end 2. The washer 3 and nut 4 serve to retain the coupling on the magneto shaft 1 as hereinafter described.

The arrestor plate 5 of the coupling is provided with the usual openings 6 for bolting the coupling to the magneto housing and is adapted to contain the usual weights which have been omitted for the simplification of the drawing. The arrestor plate 5 is journaled on the hub 7 which is keyed to the shaft 1 by the key 8.

The coupling is provided with the usual spiral or coil spring 9 in the housing 10.

The housing 10 has the central opening 11 adapted to receive the annular portion 12 of the driving member 13 and said annular portion 12 has the threaded portion 14 adapted to be engaged by the nut 15 to retain the driving member 13 in assembled relation on the housing 10.

The front surface of the housing member 10 has the recesses or slots 16 formed in the surface thereof and adapted to receive the driving lugs 17 when the driving member 13 is in position on the housing 10. The lugs 17 fit into a pair of the radial recesses or slots 16 preferably in diametrically opposed relation and are retained in said recesses or slots 16 by tightening of the nut 15 on the threaded portion 14 of the annular portion 12.

The assembled housing 10 and driving member 13 are then positioned on the hub 7 as shown in Fig. 2 and retained thereon by the washer 3 and nut 4 which engages the threaded end 2 of the shaft 1 as hereinbefore described.

The slots or recesses 16 may be of desired number and are formed at such angular relations as it is desired to locate the driving lugs 17 for the various possible installations and thus allow said lugs to be easily and quickly adjusted to the proper desired angle for the particular installation involved.

Another possible application of the present invention would be to form only a single diametrical slot 16 in the surface of the housing 10 depending upon the particular installation for which the coupling was intended and then apply the driving lug 13 by means of the nut 15 as previously described in the slot 16.

With the construction of the present invention it is merely necessary to loosen or remove the nut 15 and then rotate the driving member 13 so as to position the driving lug 17 in the proper slots 16 to obtain desired axial adjustment of the driving lugs 17 and then tighten the nut 15 to retain said lugs in such adjusted position and the driving lugs will then be locked in such adjusted position as is necessary to fit the angular requirements of the timing gear.

From the foregoing it will be seen that I have provided simple, efficient and economical means for obtaining all of the objects and advantages of the invention.

Having described my invention, I claim:

1. In a device of the character described, an annular housing, a driving member having driving lugs and a portion extending into said housing and having a plurality of sets of aligned radial slots in the outer surface of said housing adapted to receive said driving lugs and means in said housing for locking said portion of said driving member in said housing and thereby locking said driving lugs in any desired set of said slots.

2. In a device of the character described, an annular housing having a plurality of aligned radial slots in the outer surface thereof on opposite sides of the central opening therein, a driving member having driving lugs adapted to engage any desired set of said slots and a collar extending into said housing through the central opening therein and means engaging said collar for locking said driving member in position on said housing with said driving lugs in any desired set of slots.

3. In a device of the character described, an annular housing member having a plurality of aligned sets of radial slots at different angular positions in the outer surface thereof, said sets comprising aligned slots on opposite sides of the opening in said housing member, a driving member adjustable relative to said housing and having a pair of driving lugs adapted to be located in any of said sets of slots and means for locking said driving member on said housing with said lugs in any desired set of said slots.

4. In a device of the character described, an annular housing member having a plurality of sets of aligned slots in the outer surface thereof, said sets comprising aligned slots on opposite sides of the opening in said member, a driving member having portions adapted to engage any desired set of said slots and means for locking said driving member on said housing member with said driving means engaging said desired set of slots.

5. In a device of the character described, an annular housing member, the outer surface of said member having a plurality of radially disposed slots in the surface thereof, a driving member adjustable relative to said housing member and having an annular locking portion extending into the opening of said housing member and said driving member having portions engaging certain of said slots and means for locking said driving member in position on said housing.

ALBERT F. WAGNER.

REFERENCES CITED

The following references are of record in the file of this patent:

UNITED STATES PATENTS

| Number | Name | Date |
| --- | --- | --- |
| 1,057,928 | Briggs | Apr. 1, 1913 |
| 1,109,836 | Hanson | Sept. 8, 1914 |
| 1,183,681 | Schipper | May 16, 1916 |
| 1,338,758 | Tost | May 4, 1920 |
| 1,788,565 | Davis | Jan. 13, 1931 |
| 1,940,777 | Thompson | Dec. 26, 1933 |